United States Patent [19]

Serret, Jr.

[11] Patent Number: 4,833,707

[45] Date of Patent: May 23, 1989

[54] TELEPHONE LOCK UNIT

[75] Inventor: Raymond J. Serret, Jr., Bronx, N.Y.

[73] Assignee: Serret Systems Inc., Rye, N.Y.

[21] Appl. No.: 10,813

[22] Filed: Feb. 4, 1987

[51] Int. Cl.⁴ .............................................. H04M 1/66
[52] U.S. Cl. .................................... 379/200; 379/188
[58] Field of Search ............... 379/200, 199, 188, 196, 379/197, 198

[56] References Cited

U.S. PATENT DOCUMENTS

| | | | |
|---|---|---|---|
| 4,022,992 | 5/1977 | Kennedy | 379/200 |
| 4,099,033 | 7/1978 | Murray | 379/200 X |
| 4,234,764 | 11/1980 | Beebe | 379/200 |
| 4,314,108 | 2/1982 | Sharvit | 379/200 |
| 4,358,640 | 11/1982 | Murray | 379/200 |
| 4,425,480 | 1/1984 | Lischin | 379/200 |
| 4,482,787 | 11/1984 | Sagara | 379/200 |
| 4,511,765 | 4/1985 | Kuo | 379/200 |

*Primary Examiner*—James L. Dwyer

[57] ABSTRACT

A telephone lock unit having two selectable locking modes will limit (a) all long distance and operator cell connections or (b) all local, long distance and operator call connections to all persons other then those implementing the correct access code onto the telephone dial or keypad. The unit operates in conjunction with conventional pulse and tone dialing type telephones while being of a self contained electronic design. The access code which may contain 3 or 4 digits can be programmed by any authorized person by means of an internal matrix switch. A save and relock function allows any authorized person knowing the correct save and relock code the option of disabling and reinstating the locking mode function. The locking mode functions are performed electrically by momentarily disconnecting the telephone from the telephone line causing the re-occurrence of the dial tone, thus canceling all previous call atempts. The unit contains an interface circuit and while in compliance with FCC part 68 rules and regulations enables the locking of one or more telephones when are so connected to the same telephone line via a single telephone lock unit. All circuit functions are performed while the telephone and telephone lock unit are operating in a closed loop condition with the central office.

5 Claims, 2 Drawing Sheets

TELEPHONE LOCK UNIT

FIELD OF INVENTION

This invention relates to Telephone Communications. It particulary relates to the prevention of unauthorized telephone call connections to all persons other than those knowing the correct access code.

DISCUSSION OF PRIOR ART

Prior inventions intended to limit unauthorized telephone use whereby, access codes are implemented directly into the telephone device have been of both mechanical and electrical design. One such mechanical invention, U.S. Pat. No. 4,022,992—Kennedy, dated May 10, 1977 utilizes mechanical fingers and gears to accomplish its function. This invention will indeed work but lacks the versitility when compared to electronic devices. One such electronic invention is U.S. Pat. No. 4,482,787 Sagara et al, dated Nov. 13, 1984. This invention is intended for use with rotary pulse type telephones. Although this invention may be superior to many mechanical designs it suffers the same basic problem, the need to be constructed within the actual telephone device. Other inventions such as U.S. Pat. No. 4,314,108 Sharvit, dated Feb. 2, 1982 is an example of a self contained device which will operate with standard pulse type dialing telephones. However, this invention will not operate with tone type dialing telephones, this of course would present a major draw back due to the over popularity of tone dialing telephone equipment. One final invention is U.S. Pat. No. 4,234,764 Beebe, dated Nov. 18, 1980. This invention is capable of operating with both pulse and tone type dialing telephones while being of a self contained design. To the best of my knowledge Beebe's invention will provide the best overall results as compared to all prior art of this type. Also, to the best of my knowledge Beebe's invention is closest in comparison to my present Telephone Lock Unit invention than any other prior art invention. However, Beebe's invention will only provide long distance call security while allowing unlimited local call connections. One other major draw back in Beebe's invention is its high cost and large size. This is due to its many components and over complex design. It has also become apparent that many of the prior art inventions lack safeguards against "Hook-tapping". Hook-tapping may be accomplished by tapping or pressing the hook switch repeatedly until an operator signal equivalent is produced. Reaching the operator will allow a request for an operator assisted call. Obtaining an operator assisted call will of course defeat the objective of any security or locking system. It is therefore, an object of my present Telephone Lock Unit invention to over come such disadvantages which exist in known prior art.

OBJECT AND SUMMARY OF INVENTION

Accordingly, several objects of my invention are to provide a "Telephone Lock Unit" which will have the capabilities for selecting and performing A and B locking mode functions. Locking mode A will limit all outgoing local, long distance and operator call connections. Locking mode B will limit all outgoing long distance and operator call connections. Calls consisting of three numbers such as Information, 411 and Emergency, 911 will not be effected by either locking mode. Another object of my present invention is to provide capabilities whereby, an access code is used in order to disable the locking mode function. The access code is implemented directly into the telephone dial or keypad. The actual access code is selected by programing the internal Matrix Switch with either a 3 or 4 digit number of your choice. Still another object of my invention is to provide capabilities whereby, a "Save" and "Relock" command code may be selected and used to disable and reinstate the locking mode function. The save and relock command consists of two seperate codes which may be any one single digit number of your choice. Another object of my present invention is to provide the necessary electrical characteristics needed for meeting Federal Communications Commission (FCC) part 68 rules and regulation for connecting equipment to the public telephone network. In accordance with other aspects of my present invention include capabilities whereby, one or more telephone devices may be controlled by a single Telephone Lock Unit, when are so connected to a common telephone line. The final and primary object of my present invention is to provide the consumer with a Telephone Lock Unit which is inexpensive, small in size and easy to use with practically any standard telephone equipment. Further objects and advantages of my invention will become apparent from a consideration of the drawings and ensuing description thereof.

DESCRIPTION OF THE PREFERRED EMBODIMENTS

Figure 1:
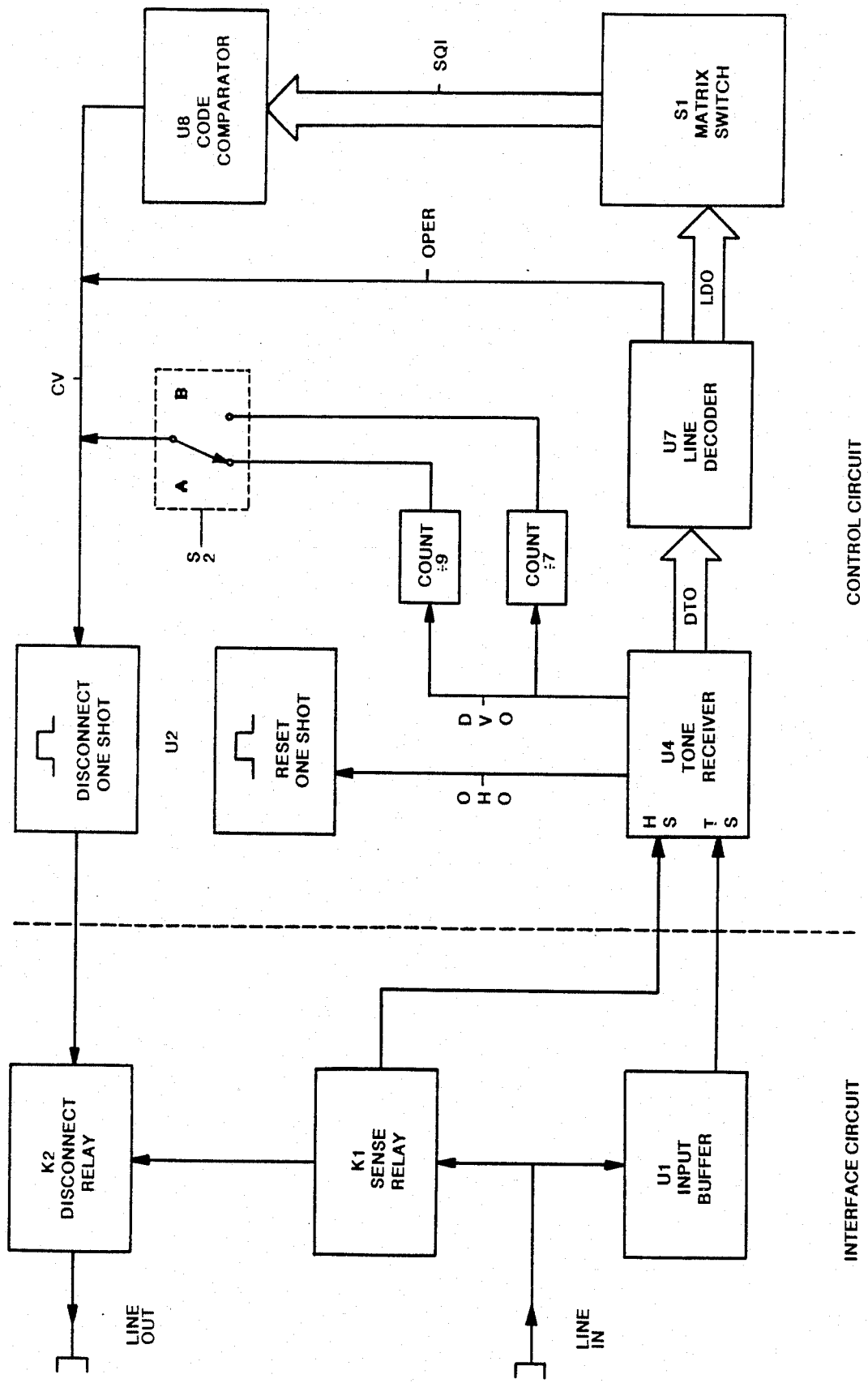
FIG. 1 is a simplified block diagram of the embodiment in my present invention.
Figure 2:
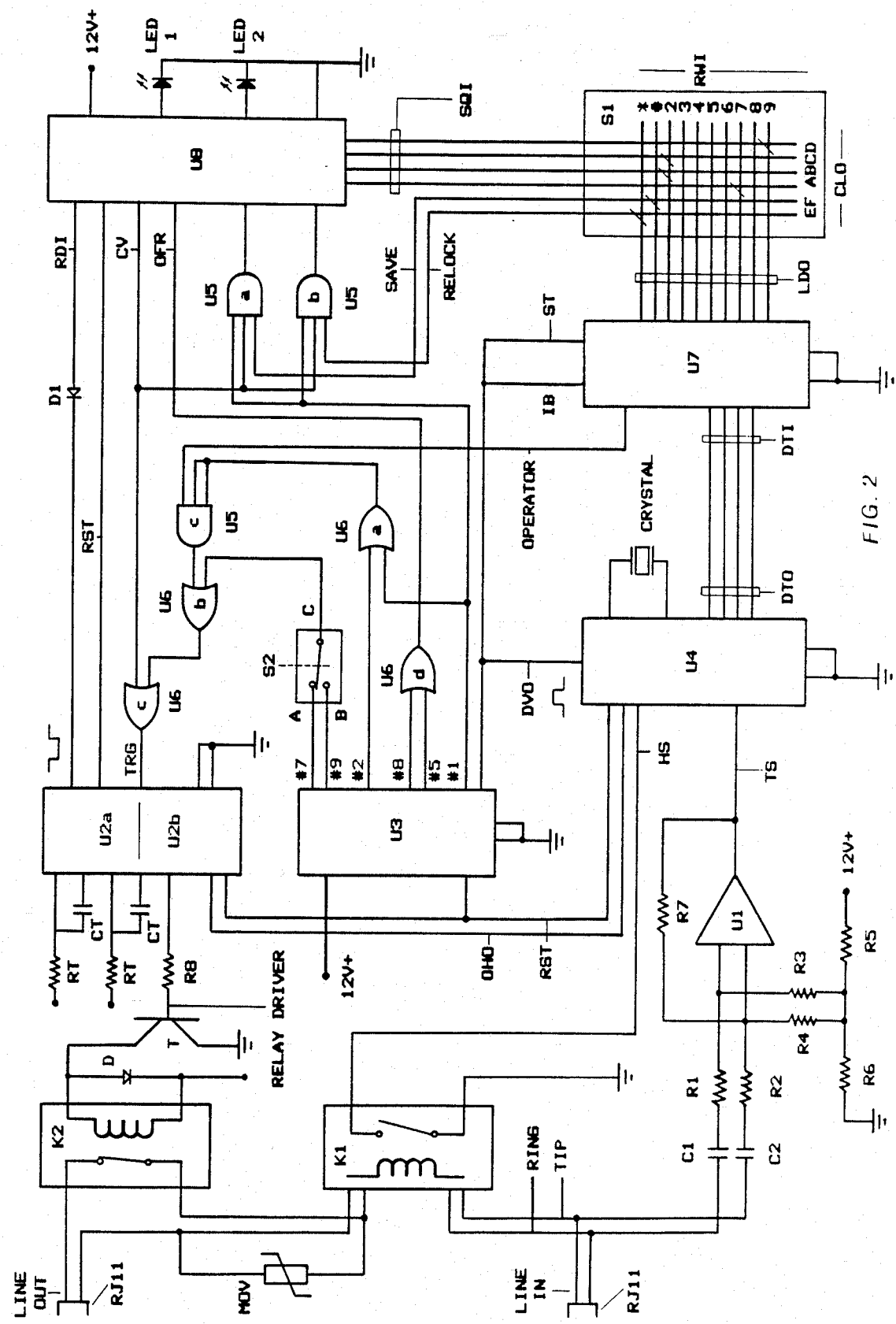
FIG. 2 is the schematic diagram of the embodiment in my present invention.

FIG. 1 is a simplified block diagram, illustrating the key components of my present invention. Furthermore, FIG. 1 breaks the circuit into two parts for which my present invention will be described. The two parts, as illustrated in FIG. 1 are the "Interface Circuit" and "Control Circuit". FIG. 2 is the schematic diagram illustrating all components and connections while also, showing FIG. 1 in complete form. First, the Interface Circuit provides the electrical link between the telephone line and the Control Circuit while providing the necessary safety and reliability features required by the FCC Part 68 code regulations. As a whole the Interface Circuit, as shown in FIG. 1 is connected in series between the telephone line and telephone device or device's. The telephone line is of the standard two wire type having a Tip and Ring pair. First, contained in the Interface Circuit is "Hook Sense Relay" K1, shown in FIG. 1. Hook Sense Relay K1 is used to monitor telephone hook status. When the telephone goes "Off-hook" loop current will flow through Hook Sense Relay K1's coils causing it's contacts to close, as shown in FIG. 2. A contact closure will indicate an Off-hook condition by producing a logic low signal at Hook Sense Relay K1's output. While the telephone is in the "On-hook" condition the signal output will remain logic low. The output from Hook Sense Relay K1 is connected to "Tone Receiver" U4's Hook Status input HS, located in the Control Circuit portion of FIG. 1. Hook Sense Relay K1 also allows Tone Receiver U4 to monitor and count rotary pulse type dialing signals. The second key component of the Interface Circuit is "Input Buffer" U1, as shown in FIG. 1. Input Buffer U1 monitors all tone signals generated on the telephone line. Input Buffer U1 operates as a differential input amplifier, enabling direct connection to the telephone line. FIG. 2 illustrates Input Buffer U1 in its entirety, as shown its make up consists of one operational amplifier and nine discrete components. Input Buffer U1's output is connected to Tone Receiver U4's signal input TI connection. The last key component of the Interface Circuit is "Disconnect Relay" K2, shown in FIG. 1. The Disconnect Relay is of the standard reed type having a single set of contacts and energizing coil. As shown in FIG. 2, Disconnect Relay K1's contacts are connected in series with the Tip side of the telephone line. Under normal operating conditions, the Disconnect Relay will stay energized keeping the relay contacts closed. This will complete the connection between the telephone line and the telephone device thus, allowing normal telephone operation. Deenergizing the relay coil will cause the contacts to open, disconnecting the telephone from the line. Disconnecting the telephone from the line simulates an on-hook condition. The above relay operations will be controlled by the "Disconnect One Shot" U2b, shown in the control portion of FIG. 1. The Disconnect One Shot produces a digital pulse which will de-energize the Disconnect Relay for 3 seconds. The 3 second disconnect time will be refered to as a "Disconnect Cycle". In other words, if while the telephone is in the off-hook position, an occuring Disconnect Cycle will electrically "hang-up" the telephone for a 3 second period. Any call attempts made prior to the Disconnect Cycle will be cancelled thus followed by a dial tone. It should now become clear that the so called "telephone locking " function will actually be performed by reoccuring disconnect cycles. The output from Disconnect One Shot U2b cannot directly drive the disconnect relay so a relay driver circuit has been incorporated, as shown in FIG. 2. The relay driver circuit contains a current limiting resistor, a NPN switching transistor and a relay coil clamping diode. The final components contained in the interface circuit are illustrated in FIG. 2. As shown, Metal Oxide Varistor MOV is connected across the telephone line to provide protection against high voltage transients. Finally, two telephone modular jacks RJ11 are used for Line In and Line Out connections. The following discussion will pertain to the "Control Circuit", illustrated in FIG. 1. The control circuit performs all key functions which include signal processing, code verification and disconnect timing. The Control Circuit first comprises "Tone Receiver" U4 FIG. 1. which decodes tone and rotary dial signals. As described earlier in the Interface Circuit, tone signals TS are obtained from Input Buffer U1 and rotary dial signals are obtained from Sense Relay K1. Each signal input or entry is decoded providing the entry proves valid. A signal entry corresponding to the numbers 0 to 9 or the digits star (*) and pound (#) will be considered valid. Each valid entry is decoded and processed individually, one at a time. Decoding the signal entry produces a corresponding four bit "Data Output" DTO. Along with the data output, Tone Receiver U4 provides a "Data Valid Output" signal DVO. The Data Valid Output DVO, as shown in FIG. 1, provides a positive clock pulse each time a valid signal entry is detected. The "Hook Status" input HS of Tone Receiver U4, in FIG. 1, processes both telephone hook conditions and rotary pulse dial signals. Once an off-hook condition is detected, the "Off-Hook Output" OHO of Tone Receiver U4, in FIG. 1 will go logic High. Off-Hook Output OHO is used to trigger the "Reset One Shot" U2b, in FIG. 1. Reset One shot U2b produces and sends a 10Ms clock pulse to the appropriate circuits requiring reset. As shown in FIG. 1, Data Output DTO from Tone Receiver U4 is connected to the "Data Input" DTI of "Line Decoder" U7. Line Decoder U7 further decodes the four bit data into eleven individual Line Outputs LDO, as shown in FIG. 2. The individual Line Outputs represent the actual valid signal entry, producing a logic high signal at its respective output. Accordingly the Line Outputs LDO are numbered 0, 2 to 9 and digits *(star) and #(pound). Only one of the Line Outputs will be activated at any one time, sending a logic high signal to "Code Comparator" U8 via "Matrix Switch" S1, as shown in FIG. 2. For example, entering the number 4 at the telephone device will in turn activate Line Output number 4. The activated Line Output will remain logic high until the next valid entry is made. The "Strobe" ST and "Inhibit" IB of Line Decoder U7 are connected to Data Valid DVO of Tone Receiver U4, as shown in FIG. 2. Strobe ST gives Line Decoder U7 the go ahead to accept and decode new data at its Data Input DTI. Inhibit IB disables the Line Outputs until Data Valid DVO returns to its normally logic low state. As shown in FIG. 2, ten of the eleven Line Outputs LDO are connected to the "Row Inputs" RWI of the 6×10 Matrix Slide Switch S1. Matrix Switch S1 is user programable, used for selecting Access, Save and Relock codes. As shown in FIG. 2, code selection is performed by sliding the designated column switch to the desired row number position. The 6×10 crosspoint configuration of Matrix Switch S1 allows any one of the six "Column Outputs" CLO to connect to any one of the ten Row Inputs RWI. In other words, a logic high Row input will produce a logic high column output only when the column to row number switch settings correspond. When selecting Access, Save and Relock codes, no one code or code digit number may be the same. This will insure that for each individual row input only one column output will exist. Four digit Access Code selection is performed by programing switch columns A, B, C, and D. The Column Outputs CLO are connected to "Sequential Inputs" SQI of Code Comparator U8, as shown in FIG. 2. Code Comparator U8 monitors the four Sequential Inputs SQI one at a time thus functioning as a sequence counter. First Sequential Input SQI-A will await a logic high signal from Matrix Switch S1 column A. Once the first correct Access Code digit is entered, satisfying Sequential Input SQI-A, Sequential Input SQI-B will then await a logic high signal from Matrix Switch S1 column B. The succession of Sequential Inputs SQI will continue until all remaining Access Code digit or digits are entered, satisfying Sequential Inputs SQI-C and D. In the event an incorrect and or out of sequence Access Code entry is made, Code Comparator U8 will internaly reset. In short, the code transformation from U7 to U8 via S1 is performed by a method similar to that of multiplexing. A 3 digit Access Code is programed as is the 4 digit Access Code except that Matrix Switch columns B and C will be set to the same number. For example, if your Access Code number choice was 729, it would be programed into Matrix Switch S1 columns A, B, C and D as 7, 2, 2 and 9, as shown in FIG. 2. This is the only time that any two code digits may be of the same number. Once the correct access code has been entered in its proper sequence, Code Comparator U8 will latch. Once Code Comparator U8 becomes latched its "Code Verification" signal CV, shown in FIG. 2, will go logic high. It is at this time that the Telephone Lock Unit is in an "Unlocked" condition. Now lock indicator LED-1 in FIG. 2 will cease to illuminate, visually indicating the present Unlocked condition. Code Verification signal CV is connected to the Disconnect One Shot U2b via OR gate U6c, shown in FIG. 2. This will trigger the Disconnect One Shot U2b producing a Disconnect Cycle as described earlier in the Interface Circuit text. The user may now place any one telephone call once the dial tone is heard. Once the call is completed and the telephone has been "hung up", Reset One Shot U2a will trigger producing the 10Ms Reset Pulse RST as also described earlier. Reset One Shot U2a will only trigger when the telephone goes from the off-hook to an on-hook position. This is because Reset One Shot U2a will only be triggered by the negative going edge of the Off-Hook Output OHO signal. Actually Reset One Shot U2a provides not one but two complementary reset pulse outputs, RST-positive and RST-negative. The reset pulse outputs, RST along with there respective connections are shown in FIG. 2. Incidentally, Disconnect One Shot U2b like Reset One Shot U2a also has complementary outputs. Because the Disconnect Cycle produces an off-hook to on-hook condition, it to will trigger Reset One Shot U2a. When a Disconnect Cycle occurs, Code Comparator U8's reset input RST will be blanked out by its "Reset Disable Input" RDI. As shown in FIG. 2, Reset Disable Input RDI is connected to the Disconnect One Shot U2b's negative pulse output via diode D1. Reset Disable Input RDI is activated each time a Disconnect Cycle occurs. This will prevent the reseting of Code Comparator U8 when the reset pulse is the result of a disconnect cycle function. In other words, a disconnect cycle when triggered by a correct access code entry will not relock the Telephone Lock Unit. Code Comparator U8 will only reset when the telephone is manually hung-up, thus relocking the Telephone Lock Unit. Refering to FIG. 2, "Decade Counter" U3 counts the number of individual entries made. Decade Counter U3's clock input is connected to Tone Receiver U4's Data Valid Output DVO, as described earlier. For each entry made Decade Counter U3 will be clocked, advancing one time. Decade Counter U3 provides ten individual outputs which are activated in order, one at a time. An activated output produces a logic high signal at its respective output. Of the ten available outputs only four will be utilized. As shown in FIG. 2, the 7th and 9th output of Decade Counter U3 are connected to the A and B switch contacts of "Locking Mode Switch" S1. Locking Mode Switch S2 allows the user to select the A or B locking mode. As described earlier, locking mode A will limit all outgoing local, long distance and operator call connections. Locking mode B will limit all long distance and operator call connections. Locking mode select switch S1 is a standard SPDT slide switch. The center contact C of Locking Mode switch S2 is connected to OR Gate U6b, FIG. 2. Accordingly, via Locking Mode Switch S1, OR Gate U6b will go logic high when activated by Decade Counter U3. This in turn will activate OR Gate U6c which will trigger the Disconnect One Shot U2b. For example, when in the A locking mode a Disconnect Cycle will occur upon the seventh number entry. It is this operation which performs the desired locking mode function. All triggering of Disconnect One Shot U2b will be disregarded when in the Unlocked condition. The 5th and 8th count outputs from Decade Counter U3 are connected to the two inputs of OR Gate U6d. The output of OR Gate U6d is then connected to Code Comparator U8's "Overflow Reset" input OFR. This will prevent Access Code entry after the 4th entry count. As shown in FIG. 2, the Save and Relock commands utilize the E and F switch columns of Matrix Switch S1. The correct Save or Relock code entry triggers Code Comparator U8 via AND Gate U5a and U5b. The actual Save and Relock functions are then performed by Code Comparator U8. One of the inputs of U5a and U5b is connected to the number 1 count output of Decade Counter U3. This will enable the triggering of the Save and Relock functions only when the particular code digit is of the first entry. The remaining input of U5a and U5b are connected to Code Verification signal CV of Code Comparator U8. This will enable the triggering of the Save and Relock functions only when in an Unlocked condition. As shown in FIG. 2, Code Comparator U8 utilizes LED-2 which will illuminate once the Save function is activated. In order to disable any operator call connections, And Gate U5c and OR Gate U6a have been utilized, as shown in FIG. 2. An operator entry decoded by Line Decoder U7 will activate AND Gate U5c. This in turn will trigger an immediate Disconnect Cycle. OR Gate U6a will disable any operator triggered Disconnect Cycle when the Operator entry is not of the 1st or 2nd entry count. The remaining discrete components are shown in FIG. 2. The Disconnect and Reset One shots U2a and U2b utilize the RT and CT components. These components provide the desired One Shot time pulse widths. Tone Receiver U4 uses a 3.579-MHz crystal for frequency reference. The Telephone Lock Unit as described, is powered by a 12 volt DC wall pack adapter. Because the DC wall pack adapter is of the standard type, it is not shown. In the event that the wall pack adapter is disconnected or tampered with, Disconnect Relay K2's contacts will open. This will prevent any telephone operation. While the above description contains many specifications, these should not be construed as limitations on the scope of the invention, but rather as an exemplification of one preferred embodiment thereof. Many other variations are possible, for example, substituting Matrix Switch S1 with an electronic memory circuit would be one possibility. Accordingly, the scope of the invention should be determined not by the embodiment illustrated, but by the appended claims and their legal equivalents.

I claim:

1. A telephone lock unit of a self contained design, for use in conjunction with conventional tone and pulse dialing telephone instruments, for limiting outgoing call connections to all persons other than those implementing the correct access code number onto said telephone dial or keypad, the improvements comprising: first locking mode for limiting long distance and operator call connections;

second locking mode for limiting all local, long distance and operator call connections;

switching means providing selection of one said first and second locking modes;

save means for disabling said locking mode;

relock means for canceling said save means for reinstating said locking mode;

receiver means for receiving telephone dial or keypad actuations and outputting signals indicating which number was dialed or pushed;

decoder means connected to the output of the receiver means;

crosspoint matrix switch means connected to said decoder means;

comparator means connected to said crosspoint matrix switch means;

said matrix switch being preprogrammed with the coded access number such that when the proper access code is decoded by said decoder the comparator will receive the proper signals from said matrix switch and will release the selected locking mode to allow certain access to phone service based upon the locking mode initially selected.

2. A telephone lock unit as set forth in claim 1, wherein said programable matrix switch further provides means of selecting said save mode based upon a save code.

3. A telephone lock unit as set forth in claim 1, wherein said programable matrix switch further provides means of selecting said relock mode based upon a relock code.

4. A telephone lock unit as set forth in claim 1, wherein an indicator light is used for means of viewing the operating condition of said first and second locking modes.

5. A telephone lock unit as set forth in claim 1, wherein a indicator light is used for means of viewing the operating condition of said save means.

* * * * *